US011708667B2

(12) United States Patent
Mason et al.

(10) Patent No.: US 11,708,667 B2
(45) Date of Patent: Jul. 25, 2023

(54) CONTROLLED POROSITY STRUCTURAL MATERIAL WITH NANOCELLULOSE FIBERS

(71) Applicant: University of Maine System Board of Trustees, Orono, ME (US)

(72) Inventors: Michael Darin Mason, Orrington, ME (US); David Gregg Holomakoff, Portland, ME (US); Muhammad Radowan Hossen, Orono, ME (US)

(73) Assignee: University of Maine System Board of Trustees, Orono, ME (US)

( * ) Notice: Subject to any disclaimer, the term of this patent is extended or adjusted under 35 U.S.C. 154(b) by 254 days.

(21) Appl. No.: 17/095,469

(22) Filed: Nov. 11, 2020

(65) Prior Publication Data
US 2021/0071366 A1 Mar. 11, 2021

Related U.S. Application Data

(62) Division of application No. 16/086,988, filed as application No. PCT/US2017/023485 on Mar. 21, 2017, now Pat. No. 10,870,950.
(Continued)

(51) Int. Cl.
*D21H 11/18* (2006.01)
*D21C 9/18* (2006.01)
(Continued)

(52) U.S. Cl.
CPC ............... *D21H 11/18* (2013.01); *C08L 1/02* (2013.01); *D21C 9/007* (2013.01); *D21C 9/18* (2013.01);
(Continued)

(58) Field of Classification Search
None
See application file for complete search history.

(56) References Cited

U.S. PATENT DOCUMENTS

| | | |
|---|---|---|
| 2004/0200587 A1 | 10/2004 | Herring et al. |
| 2010/0282422 A1 | 11/2010 | Miyawaki et al. |
| (Continued) | | |

FOREIGN PATENT DOCUMENTS

| | | | | |
|---|---|---|---|---|
| CA | 2731287 A1 | * | 12/2009 | ............. D21H 13/00 |
| WO | WO-01/21873 A1 | | 3/2001 | |
| (Continued) | | | | |

OTHER PUBLICATIONS

International Search Report for PCT/US17/23485, 3 pages, dated Jun. 19, 2017.
(Continued)

*Primary Examiner* — Dennis R Cordray
(74) *Attorney, Agent, or Firm* — Choate, Hall & Stewart LLP; Brian E. Reese; Michael D. Schmitt

(57) ABSTRACT

The present invention provides, inter alia, biocompatible porous structural materials made exclusively or almost exclusively from nanocellulose fibers (CNF), CNC, or bacterial cellulose, as well as processes for making and using provided compositions. Provided compositions may possess specifically tailored mechanical strength properties and have a design-controlled porosity that is homogeneous or graded, depending on the application. Provided compositions may be manufactured by the controlled dewatering of suspensions of CNF. In some embodiments, provided compositions may include a solids concentration of about 10% to about 95% by weight. Controlled water removal and pore homo- or heterogeneity may be accomplished by controlling capillary, hydrostatic and evaporative processes in the environment of a porous mold around the CNF slurry. A freeze drying or vacuum drying step may be used to complete the
(Continued)

drying process, locking in the porous network structure resulting in a predetermined porosity (pore volume/total volume), and pore size distribution.

19 Claims, 8 Drawing Sheets

Related U.S. Application Data

(60) Provisional application No. 62/310,931, filed on Mar. 21, 2016.

(51) Int. Cl.
| | | |
|---|---|---|
| *D21H 17/25* | (2006.01) | |
| *D21C 9/00* | (2006.01) | |
| *C08L 1/02* | (2006.01) | |
| *D21H 21/22* | (2006.01) | |
| *D21H 17/67* | (2006.01) | |

(52) U.S. Cl.
CPC ............. *D21H 17/25* (2013.01); *D21H 17/67* (2013.01); *D21H 21/22* (2013.01)

(56) References Cited

U.S. PATENT DOCUMENTS

| | | |
|---|---|---|
| 2012/0090192 A1 | 4/2012 | Oevreboe et al. |
| 2012/0132381 A1 | 5/2012 | Hentze et al. |
| 2012/0132383 A1* | 5/2012 | Laine .................... D21H 17/69 162/175 |
| 2014/0079931 A1 | 3/2014 | Berglund et al. |
| 2015/0033983 A1 | 2/2015 | Bilodeau et al. |
| 2015/0045549 A1 | 2/2015 | Laukkanen et al. |
| 2015/0068973 A1 | 3/2015 | Bessonoff et al. |
| 2015/0315747 A1 | 11/2015 | Heiskanen et al. |
| 2015/0330023 A1* | 11/2015 | Hillebrand ................ D21F 1/66 162/1 |
| 2016/0130370 A1 | 5/2016 | Meredith, III et al. |
| 2017/0314201 A1 | 11/2017 | Hikida |
| 2019/0093288 A1 | 3/2019 | Mason et al. |

FOREIGN PATENT DOCUMENTS

| | | |
|---|---|---|
| WO | WO-2011/001036 A1 | 1/2011 |
| WO | WO-2013/188657 A1 | 12/2013 |
| WO | WO-2015/171714 A1 | 11/2015 |
| WO | WO-2017/165465 A1 | 9/2017 |

OTHER PUBLICATIONS

Jorfi, M. and Foster, E. J., Recent advances in nanocellulose for biomedical applications, Journal of Applied Polymer Science, 417919:1-19 (2015).
Kappel, L. et al., Revisiting Polarized Light Microscopy for Fiber-Fiber Bond Area Measurement—Part II: Proving the Applicability, Nordic Pulp and Paper Research Journal, 20(1): 071-075 (2010).
Lin, N. and Dufresne, A., Nanocellulose in biomedicine: Current status and future prospect, European Polymer Journal, 59: 302-325 (2014).
Siro, I. and Plackett, D., Microfibrillated cellulose and new nanocomposite materials: a review, Cellulose, 17: 459-494 (2010).
Veigel, S. et al, Particle Board and Oriented Strand Board Prepared with Nanocellulose-Reinforced Adhesive, Journal of Nanomaterials, 2012: 1-8 (2012).
Written Opinion for PCT/US17/23485, 10 pages, Jun. 19, 2017.

* cited by examiner

CONTROLLED POROSITY STRUCTURAL MATERIAL WITH NANOCELLULOSE FIBERS

CROSS-REFERENCE TO RELATED APPLICATIONS

This application is a division of U.S. patent application Ser. No. 16/086,988, filed on Sep. 20, 2018, which is a national stage entry of international (PCT) application no. PCT/US17/23485, filed on Mar. 21, 2017, which claims the benefit of U.S. provisional patent application No. 62/310,931, filed on Mar. 21, 2016, the disclosure of which is hereby incorporated in its entirety.

BACKGROUND OF THE INVENTION

The present invention relates generally to the field of cellulose processing, and, in accordance with various embodiments, more specifically to porous biocompatible structural materials made exclusively or almost exclusively from nanocellulose.

Two recent review articles discuss the potential biomedical applications for nanocellulose. These are: Lin, N. and Dufresne, A., *Nanocellulose in biomedicine: Current status and future prospect*, European Polymer Journal 59: 302-325 (2014); and Jorfi, M. and Foster, J., *Recent advances in nanocelulose for biomedical applications*, J. Applied Polymer Science (2015) DOI 10.1002 app 41719, both incorporated herein in their entirety. These reviews both divide nanocellulose fibers into three categories crystalline nanocellulose (CNC), which is typically chemically destructured from wood, and maintains a crystalline regularity; nanocellulose fibrils (CNF) which are typically mechanically destructured from wood and form elongated fibers containing portions of amorphous cellulose in addition to portions of crystalline cellulose; and bacterial nanocellulose (BC or BNC) which is manufactured by various bacteria. The present application mainly concerns CNC and CNF, as byproducts of wood, though bacterial cellulose is also desirable for use in some embodiments. In general, nanocellulose is characterized by high surface area and plentiful hydroxyl groups available for hydrogen bonding. Though limited in important ways, solid materials composed primarily of nanocellulose have been shown by the references above to exhibit mechanical properties resembling modern plastics, while at the same time demonstrating superior biocompatibility and hydrophilicity.

Porous or permeable materials, with controlled but varying: density, porosity, pore size distribution, biocompatibility, hydrophobicity, dissolution kinetics and other properties, are now being widely investigated for numerous biomedical applications. To date, these materials are generally limited to (very low porosity) thin film membranes of synthetic or bioderived plastics or to very low wt % hydrogels.

It would be advantageous if there could be developed a new class of biocompatible materials (including thin films and larger solid forms) that can be generated to have well defined mechanical properties while at the same time having controlled properties such as: density, porosity, pore size distribution, biocompatibility, hydrophobicity, and dissolution kinetics; and that can be manipulated further for biomedical applications and devices.

Nanofibrillated celluloses have also been shown to be useful as reinforcing materials in wood and polymeric composites, as barrier coatings for paper, paperboard and other substrates, and as a paper making additive to control porosity and bond dependent properties. For example, a review article by Siro I., and D. Plackett, "*Microfibrillated cellulose and new nanocomposite materials: a review*", Cellulose 17:459-494 (2010) discusses recent trends. A number of groups are looking at the incorporation of nanocellulose materials into paper or other products: while other research groups are looking at using this material at low concentrations as reinforcements in plastic composites. In these cases, the prevalent thinking is that nanofibers can be used in combination with the polymeric binder in composites, typically as reinforcement, not as a replacement adhesive in lieu of the polymers. For example, Veigel S., J. Rathke, M. Weigl, W. Gindl-Altmutter, in "*Particle board and oriented strand board prepared with nanocellulose-reinforced adhesive*", J. of Nanomaterials, 2012, Article ID 158503 1-8, (2012) discuss using nanocellulose to reinforce the polymeric resins, but still retain resins in the system. The approaches by these other groups use only small volumes of fibers in high value products to enhance a specific property, but not as the sole or principle component.

Co-owned US2015/0033983 described certain building materials that can be made using cellulose nanofibers as a binder for wood or other cellulose composites.

A problem associated with production of large volumes of purified nanocellulose (CNC or CNF) from wood products is that large volumes of water must be employed to create slurries or suspensions used for either chemical or mechanical breakdown. These must be dilute enough (in the sense of wood weight) to provide sufficient surface area for chemical activity, or to flow through refining machinery necessary for mechanical breakdown. This creates a secondary problem of removing the water or drying the nanocellulose quickly. Typical slurries contain about 90-97% or more of the weight as water. Drying these slurries by heat, air and gravity alone results in layered or graduated density and upper layers compress lower layers. Moreover, hydrogen bonding forms erratically when CNF is dried in this fashion.

It is well documented, by the pulp and paper industry and others, that rapidly removing water from cellulose (and more recently nanocellulose) slurries or suspensions, dramatically reduces the extent to which hydrogen bonding networks can be formed. Hence, materials dewatered rapidly in this way show significantly diminished mechanical properties poorly suited to mechanical or structural applications.

It would be advantageous if there could be developed a new cost effective process for producing high quality porous solid forms of predominantly CNF (and CNC) with well-defined mechanical properties while at the same time having controlled; density, porosity, pore size distribution, biocompatibility, hydrophobicity, dissolution kinetics, and that can be further manipulated for biomedical applications.

SUMMARY OF THE INVENTION

The present invention provides, inter alia, new compositions comprising e.g., cellulose nanofibrils (CNF), which exhibit high levels of intermolecular CNF to CNF hydrogen bonding. In contrast to previously known techniques, in some embodiments, the methods provided herein allow for the production of compositions which exhibit desirable mechanical and other characteristics, while being comprised entirely, or substantially entirely, out of nanocellulose.

In some embodiments, the present invention provides compositions including a plurality of nanocellulose fibrils, wherein the number of intermolecular hydrogen bonds in the composition that are nanocellulose fibril to nanocellulose fibril hydrogen bonds, is, per kilogram of material, between 2 and 10,000 times greater than that of Kraft pulp, and wherein the composition is porous. In some embodiments, the number of intermolecular hydrogen bonds in the composition that are nanocellulose fibril to nanocellulose fibril hydrogen bonds, is, per kilogram of material, between 10 and 1,000 times greater than that of Kraft pulp.

In accordance with various embodiments, the present invention also provides methods for, inter alia, fabricating porous nanocellulose materials including the steps of placing an aqueous suspension comprising nanocellulose fibrils in contact with a first surface of a porous dewatering material, and removing at least a portion of the water in the aqueous suspension via capillary action thereby forming a porous nanocellulose material, wherein the removing step continues for at least 8 hours.

In some embodiments, provided methods further include the steps of separating the porous nanocellulose material from the first surface of the porous dewatering material, and further drying the porous nanocellulose material. In some embodiments, the further drying results in a porous nanocellulose material comprising a nanocellulose solids content from about 15 wt % to about 95 wt %.

In some embodiments, provided methods further include the steps of freezing remaining water in the porous nanocellulose material, and evaporating the frozen remaining water from the porous nanocellulose material.

In some embodiments, provided methods further include the steps of immersing the porous nanocellulose material in an aqueous suspension comprising water and nanocellulose fibrils, and removing at least a portion of the water in the aqueous suspension via capillary action thereby forming a second porous nanocellulose material, wherein the removing step continues for at least 8 hours. In some embodiments, the porosity of the porous nanocellulose material and the second porous nanocellulose material are different.

One of the surprising discoveries of the present invention is that the use of slow and controlled dewatering (e.g., via capillary action) results in the production of desirable material characteristics in a resultant cellulose nanofibril composition, including a high degree of CNF to CNF hydrogen bonding. In some embodiments, the rate of water removal is between 0.001 and 2.0 L/hr/20 L of starting aqueous suspension. In some embodiments, the rate of water removal may be between 0.001 and 1.0 L/hr/20 L of starting aqueous suspension, 0.001 and 0.1 L/hr/20 L of starting aqueous suspension, 0.001 and 0.01 L/hr/20 L of starting aqueous suspension, 0.01 and 2.0 L/hr/20 L of starting aqueous suspension, 0.01 and 1.0 L/hr/20 L of starting aqueous suspension, 0.1 and 2.0 L/hr/20 L of starting aqueous suspension, or 0.1 and 1.0 L/hr/20 L of starting aqueous suspension. In some embodiments, the rate of water removal is not constant during the removing step. In some embodiments, the rate of dewatering is increased during the removing step. In some embodiments, the rate of dewatering is decreased during the removing step.

One of the advantages of various embodiments of the present invention is the very high degree of control over the porosity of provided compositions that are made possible via the methods provided herein. For example, in some embodiments, provided methods and compositions may allow for precise control over one or more of: the degree of porosity, the distribution of the porosity, the size of the pores, the spacing of the pores, and the shape of the pores. In some embodiments, provided compositions may have a porosity of between about 5 vol % to about 95 vol %, inclusive. In some embodiments, the porosity of provided compositions is homogeneous. In some embodiments, the porosity of provided compositions is heterogeneous. In some embodiments, the porosity of provided compositions comprises a gradual or stepwise variation of porosity within the composition.

Another advantage of various embodiments of the present invention is that the dewatering rate may be controlled through the manipulation of at least one of temperature and pressure. In some embodiments, the manipulation of pressure and/or temperature occurs in an area where the aqueous suspension is present. In some embodiments, the manipulation of pressure and/or temperature occurs in an area that is separated from the aqueous suspension by, inter alia, the porous dewatering material. In some embodiments, provided methods further include the step of controlling at least one of pressure and temperature to control a rate of water removal from a second surface of the porous dewatering material until the porous nanocellulose material comprises about 5 wt % to about 95 wt % nanocellulose solids. In some embodiments, the second surface of the porous dewatering material is opposite the first surface. In some embodiments, the at least one of pressure and temperature are at least one of pressure and temperature at the second surface of the porous dewatering material. In some embodiments, controlling the pressure comprises creating at least a partial vacuum.

In accordance with various embodiments, aspects of the present invention allow for the production of compositions with very high amounts of nanocellulose fibrils. For example, in some embodiments, provided compositions comprise between about 5 wt % to about 95 wt % (e.g., 5 to 90 wt %, 5-80 wt %, 5 to 70 wt %, 5 to 60 wt %, 5 to 50 wt %, 5 to 40 wt % 5 to 30 wt %, 5 to 20 wt %, 5 to 10 wt %, 10 to 90 wt %, 10 to 80 wt %, 10 to 70 wt %, 10 to 60 wt %, 10 to 50 wt %, 10 to 40 wt/o, 10 to 30 wt %, 10 to 20 wt %, etc) nanocellulose fibrils, inclusive.

In accordance with any of a variety of embodiments, any application-appropriate porous dewatering material may be used. In some embodiments, in order to be useful in accordance with provided methods, the porous dewatering material must be able to facilitate the movement of water out of the aqueous suspension and across the porous dewatering material, for example, to an exterior surface (i.e., a surface not in contact with the aqueous suspension). In some embodiments, the porous dewatering material comprises a hydrophilic surface. In some embodiments, the porous dewatering material is selected from the group consisting of firebrick, kiln brick, cinderblock, terra cotta ceramics, and porous gypsum based materials (e.g., plaster of Paris).

In some embodiments, the aqueous suspension comprises between about 1 wt % to about 10 wt % nanocellulose solids prior to the initiation of the removing step.

In some embodiments, provided compositions may include an interior volume and an exterior volume, wherein the exterior volume at least partially surrounds the interior volume and a porosity of the interior volume and a porosity of the exterior volume are different. In some embodiments, the interior volume and exterior volume may be or comprise distinct layers. In some embodiments, the interior and exterior volumes are distinct portions of a single continuous composition. In some embodiments, the exterior volume completely envelops the interior volume. In some embodiments, the porosity of the interior volume is higher than the porosity of the exterior volume. In some embodiments, the porosity of the interior volume is lower than the porosity of the exterior volume. In some embodiments, at least one of the interior volume and exterior volume may include one or more additives and the additives, concentrations or additives, etc, may either be the same or different between the interior volume and exterior volume.

In some embodiments, provided compositions further comprise at least one additive. In some embodiments, the at least one additive is or comprises a nanomaterial or polymer (e.g., carboxymethyl cellulose (CMC)). In some embodiments, the nanomaterial is or comprises a nanoparticle, nanospheres, a nanostar, nanowire, and/or a nanorod. In some embodiments, the nanoparticle comprises at least one metal or polymer (e.g., carboxymethyl cellulose (CMC)). In some embodiments, the at least one metal comprises gold, silver, platinum, any ferromagnetic metal, titania, copper, and combinations thereof. In some embodiments, the at least one additive is or comprises a mineral. In some embodiments, the mineral is selected from hydroxyapatite, calcium phosphate, and combinations thereof.

In one aspect, the invention involves application of a new class of nanocellulose- (including, for example CNF and/or CNC) based solid materials having controlled porosity. In accordance with various embodiments, generation of these materials involves controlling the rate and extent to which CNF (or, e.g., CNC) hydrogen bonding networks are formed, specifically during the process of water removal from, for example, 2-5 wt % CNF solids to anywhere from about 10-95 wt % CNF solids in a solid object or form. The resulting solid forms are porous with porosities ranging from, for example, 5% to 90% by volume. Furthermore, solid form porosities can be made to be homogeneous throughout the material, or heterogeneous, being continuously variable, or of stepped porosity. In some embodiments, the resulting material solid forms consist essentially of hydrogen bonded CNF, but can include additives (molecular or particulate) that are not related to mechanical properties, but are related to desired physical or chemical properties (magnetic, optical, electronic, etc).

In another aspect, the invention includes methods of removing water from CNF (or CNC) suspensions to create a solid material form, while controlling and maintaining a porous network in the solid. This may be done, for example, by placing the suspension in a porous vessel and balancing the effects of capillary pressure, hydrostatic pressure and enthalpy. Through this process, the resulting porous solids can be engineered to meet the specific needs of a broad range of applications. Without wising to be bound by any particular theory, it is believed that balancing the effects of capillary pressure, hydrostatic pressure and enthalpy allows sufficient hydrogen bonding to take place to impart mechanical strength properties to the porous forms.

In some embodiments, provided materials may be used, inter alia, as orthopedic and other medical products. Non-limiting examples include screws, pins, plates, sutures, cortical plugs/spinal spacers, artificial "skin", meniscus tissue, wicking sensors, silver doped wicks. In some embodiments, provided materials may be used for drug delivery, for example, sustained drug delivery.

As used in this application, the terms "about" and "approximately" are used as equivalents. Any numerals used in this application with or without about/approximately are meant to cover any normal fluctuations appreciated by one of ordinary skill in the relevant art.

Other features, objects, and advantages of the present invention are apparent in the detailed description that follows. It should be understood, however, that the detailed description, while indicating embodiments of the present invention, is given by way of illustration only, not limitation. Various changes and modifications within the scope of the invention will become apparent to those skilled in the art from the detailed description.

BRIEF DESCRIPTION OF THE DRAWING

The accompanying figures, incorporated herein and forming a part of the specification, illustrate the present invention in its several aspects and, together with the description, serve to explain the principles of the invention. In the figures, the thickness of the lines, layers, and regions may be exaggerated for clarity.

Figure 1:
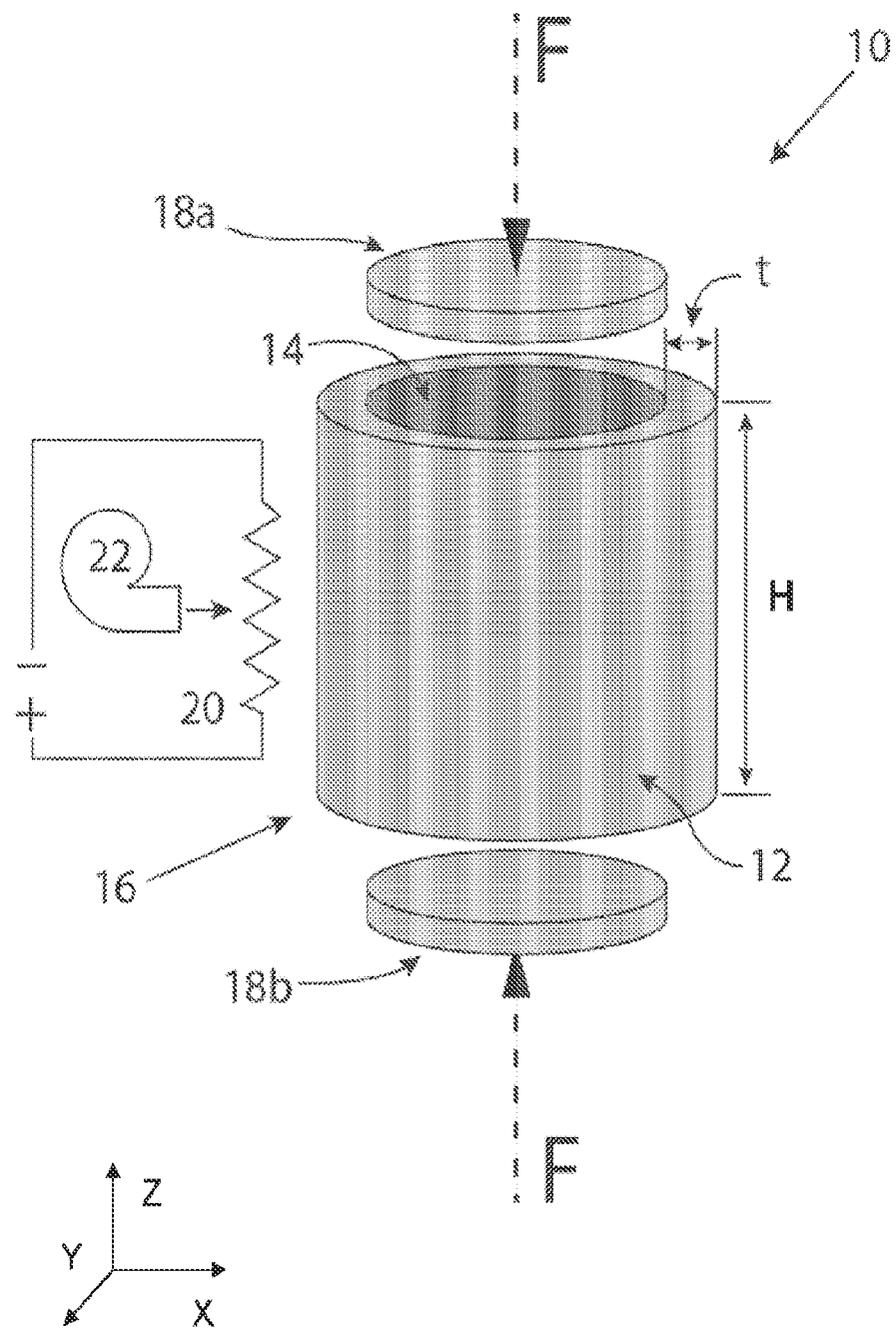
FIG. 1 is an exemplary schematic diagram of a mold useful in the invention, according to an illustrative embodiment.

Various aspects of this invention will become apparent to those skilled in the art from the following detailed description of the preferred embodiment, when read in light of the accompanying figures.

DETAILED DESCRIPTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including books, journal articles, published U.S. or foreign patent applications, issued U.S. or foreign patents, and any other references, are each incorporated by reference in their entireties, including all data, tables, figures, and text presented in the cited references.

Numerical ranges, measurements and parameters used to characterize the invention—for example, angular degrees, quantities of ingredients, polymer molecular weights, reaction conditions (pH, temperatures, charge levels, etc.), physical dimensions and so forth—are necessarily approximations; and, while reported as precisely as possible, they inherently contain imprecision derived from their respective measurements. Consequently, all numbers expressing ranges of magnitudes as used in the specification and claims are to be understood as being modified in all instances by the term "about." All numerical ranges are understood to include all possible incremental sub-ranges within the outer boundaries of the range. Thus, a range of 30 to 90 units discloses, for example, 35 to 50 units, 45 to 85 units, and 40 to 80 units, etc. Unless otherwise defined, percentages are wt/wt %.

Nanocellulose fibrils (NCF) are also known in the literature as microfibrillated cellulose (MCF), cellulose microfibrils (CMF) and cellulose nanofibrils (CNF), but these are different from crystalline nanocellulose (CNC). Despite this nomenclature variability in the literature, the present invention is applicable to nanocellulose fibrils, independent of the actual physical dimensions, provided at least one dimension (typically a fiber width) is in the nanometer range. They are generally produced from wood pulps by a refining, grinding, or homogenization process, described below, that governs the final length. The fibers tend to have at least one dimension (e.g. diameter) in the nanometer range, although fiber lengths may vary from 0.1 mm to as much as about 4.0 mm depending on the type of wood or plant used as a source and the degree of refining. In some embodiments, the "as refined" fiber length is from about 0.2 mm to about 0.5 mm. Fiber length is measured using industry standard testers, such as the TechPap Morphi Fiber Length Analyzer. Within limits, as the fiber is more refined, the % fines increases and the fiber length decreases. According to certain embodiments, aspects of the present invention may also apply to CNC and/or bacterial cellulose.

General Pulping and CNF Processes

Wood is converted to pulp for use in paper manufacturing according to known processes. The commonly used chemical pulping processes include: (a) the Kraft process, (b) the sulfite process, and (c) the soda process. These processes need not be described here as they are well described in the literature, including Smook, Gary A., Handbook for Pulp & Paper Technologists, Tappi Press, 1992 (especially Chapter 4), and the article: "Overview of the Wood Pulp Industry," Market Pulp Association, 2007.

A generalized process for producing nanocellulose or fibrillated cellulose is disclosed in PCT Patent Application No. WO 2013/188,657, which is herein incorporated by reference in its entirety. The process includes a step in which the wood pulp is mechanically comminuted in any type of mill or device that grinds the fibers apart. Such mills are well known in the industry and include, without limitation, Valley beaters, single disk refiners, double disk refiners, conical refiners, including both wide angle and narrow angle, cylindrical refiners, homogenizers, microfluidizer, and other similar milling or grinding apparatus. These mechanical comminution devices need not be described in detail herein, since they are well described in the literature, for example, Smook, Gary A., Handbook for Pulp & Paper Technologists, Tappi Press, 1992 (especially Chapter 13). Tappi standard T200 describes a procedure for mechanical processing of pulp using a beater. The process of mechanical breakdown or comminution, regardless of instrument type, is generally referred to in the pulp literature as "refining."

The extent of refining may be monitored during the process by any of several means. Certain optical instruments can provide continuous data relating to the fiber length distributions and percent fines, either of which may be used to define endpoints for the comminution stage. Within limits, as the fiber is more refined, the % fines increases and the fiber length decreases. Fiber length is measured using industry standard testers, such as the TechPap Morphi Fiber Length Analyzer, which reads out a particular "average" fiber length. In some embodiments, the "as refined" fiber length is from about 0.1 mm to about 0.6 mm, or from about 0.2 mm to about 0.5 mm.

A number of mechanical treatments to produce highly fibrillated cellulose have been proposed, including homogenizers and ultrafine grinders. However, the amount of energy required to produce fibrillated cellulose using these devices is very high and is a deterrent to commercial application of these processes for many applications. U.S. Pat. No. 7,381,294 (Suzuki et al.) describes the use of low consistency refiners to produce fibrillated cellulose. Low consistency refiners are widely used in the paper industry to generate low levels of fiber fibrillation. Suzuki teaches that microfibrillated cellulose can be produced by recirculating fiber slurry through a refiner. However, as many as 80 passes through the refiner may be needed, resulting in very high specific energy consumption, for both pumping and refiner operations. Suzuki discloses that, under the conditions specified in U.S. Pat. No. 7,381,294, the refiner operates at very low energy efficiency during the processing of the slurry. Also, the lengthy time required to process the pulp to the desired end result contributes to the high energy consumption. Suzuki teaches that, for the preferred method of using two refiners sequentially, the first refiner should be outfitted with refiner disc plates with a blade width of 2.5 mm or less and a ratio of blade to groove width of 1.0 or less. Refiner disc plates with these dimensions tend to produce refining conditions characterized by low specific edge load, also known in the art as "brushing" refining, which tends to promote hydration and gelation of cellulose fibers.

Co-owned patent publication WO2015/171714 describes a refining process for preparing nanocellulose fibers from wood products, and is incorporated herein in its entirety. Researchers at the University of Maine have found that specific arrangements of the mechanical refining devices can achieve an unexpected reduction in the energy requirements of the process, thereby lowering overall manufacturing costs. The method consists of processing a slurry of cellulosic fibers, preferably wood fibers, which have been liberated from the lignocellulosic matrix using a pulping process. The pulping process can be a chemical pulping process such as the sulfate (Kraft) or sulfite process. The process may include first and second mechanical refiners which apply shear to the fibers. The refiners can be low consistency refiners. The shear forces help to break up the fiber's cell walls, exposing the fibrils and nanofibrils contained in the wall structure. As the total cumulative shear forces applied to the fibers increase, the concentration of nanofibrils released from the fiber wall into the slurry increases. The mechanical treatment continues until the desired quantity of fibrils is liberated from the fibers. While not essential to the present invention, it makes the manufacturing process more economical. This process has been well developed in the last couple of years at the University of Maine, which is operating a pilot scale production of cellulose nanofibers with a scale of one dry ton per day. The unique aspect of this work is that the process requires low energy input to produce a low cost material with no side products.

In all such refining processes, a large volume of water is employed. As noted, the slurries may comprise 90-99% (by weight) of water and only 1-10% fibers. If desired, complete water removal is routinely achieved through conventional means (evaporation, freeze-drying, electrospraying), resulting in powders or brittle materials from which powders are generated by grinding (comminution). Either wet or dry CNF may be used in small percentages as binders or reinforcements in other products as is known from several of the prior applications mentioned. For many biomedical applications, in contrast, solid porous forms of pure CNF are desired. Existing production methods are not suited to the generation of structurally relevant porous solids composed entirely, or nearly entirely, of nanocellulose.

Exemplary Provided Methods and Compositions

In some embodiments, the present invention provides compositions including a plurality of nanocellulose fibrils (CNF), wherein the number of intermolecular hydrogen bonds in the composition that are nanocellulose fibril to nanocellulose fibril hydrogen bonds, is, per kilogram of material, between 2 and 10,000 times greater than that of Kraft pulp, and wherein the composition is porous According to various embodiments, the degree of intermolecular CNF to CNF hydrogen bonding in a provided composition may be tailored as desired by varying certain parameters of provided methods. As described herein, provided methods allow for a very large range of tailoring of the resultant compositions. By way of example, in some embodiments, the number of intermolecular hydrogen bonds in the composition that are nanocellulose fibril to nanocellulose fibril hydrogen bonds, is, per kilogram of material, between 2 and 10,000 (e.g., between 2 and 5,000, between 2 and 1,000, between 2 and 500, between 2 and 100, between 2 and 10, between 10 and 10,000, between 10 and 5,000, between 10 and 1,000, between 10 and 500, between 10 and 100, or between 1,000 and 10,000, inclusive) times greater than that of Kraft pulp. In some embodiments, the number of intermolecular hydrogen bonds in the composition that are nanocellulose fibril to nanocellulose fibril hydrogen bonds, is, per kilogram of material are at least two (2) times greater than that of Kraft pulp. In some embodiments, the number of intermolecular hydrogen bonds in the composition that are nanocellulose fibril to nanocellulose fibril hydrogen bonds, is, per kilogram of material are at least ten (10) times greater than that of Kraft pulp. In some embodiments, the number of intermolecular hydrogen bonds in the composition that are nanocellulose fibril to nanocellulose fibril hydrogen bonds, is, per kilogram of material are at least fifty (50) times greater than that of Kraft pulp. In some embodiments, the number of intermolecular hydrogen bonds in the composition that are nanocellulose fibril to nanocellulose fibril hydrogen bonds, is, per kilogram of material are at least one hundred (100) times greater than that of Kraft pulp. In some embodiments, the number of intermolecular hydrogen bonds in the composition that are nanocellulose fibril to nanocellulose fibril hydrogen bonds, is, per kilogram of material are at least five hundred (500) times greater than that of Kraft pulp. In some embodiments, the number of intermolecular hydrogen bonds in the composition that are nanocellulose fibril to nanocellulose fibril hydrogen bonds, is, per kilogram of material are at least one thousand (1,000) times greater than that of Kraft pulp. In some embodiments, the number of intermolecular hydrogen bonds in the composition that are nanocellulose fibril to nanocellulose fibril hydrogen bonds, is, per kilogram of material are at least five thousand (5,000) times greater than that of Kraft pulp. In some embodiments, the number of intermolecular hydrogen bonds in the composition that are nanocellulose fibril to nanocellulose fibril hydrogen bonds, is, per kilogram of material are at least ten thousand (10,000) times greater than that of Kraft pulp.

As used herein, the term "Kraft pulp" refers to the material described in Kappel et al., Revisiting Polarized Light Microscopy for Fiber-Fiber Bond Area Measurement—Part II: Proving the Applicability, 2010, Nordic Pulp and Paper Research Journal, vol. 25(1), pgs 071-075.

In accordance with various embodiments, aspects of the present invention allow for the production of compositions with very high amounts of nanocellulose fibrils. For example, in some embodiments, provided compositions comprise between about 5 wt % to about 95 wt % nanocellulose fibrils, inclusive. In some embodiments, provided compositions comprise between 10 and 95% wt nanocellulose fibrils (e.g., 15-95%, 20-95%, 30-95%, 40-95%, 50-95%, 20-95%, 20-90%, 20-85%, 20-80%, 20-75%, 20-70%, 20-65%, 20-60%, 20-55%, 20-50%, 20-45%, 20-40%, 20-35%, 20-30%), inclusive.

In some embodiments, provided compositions may include an interior volume and an exterior volume, wherein the exterior volume at least partially surrounds the interior volume and a porosity of the interior volume and a porosity of the exterior volume are different. In some embodiments, the interior volume and exterior volume may be or comprise distinct layers. In some embodiments, the interior and exterior volumes are distinct portions of a single continuous composition. In some embodiments, the exterior volume completely envelops the interior volume. In some embodiments, the porosity of the interior volume is higher than the porosity of the exterior volume. In some embodiments, the porosity of the interior volume is lower than the porosity of the exterior volume.

Water Removal and Pore Formation Apparatus and Process

Figure 11:
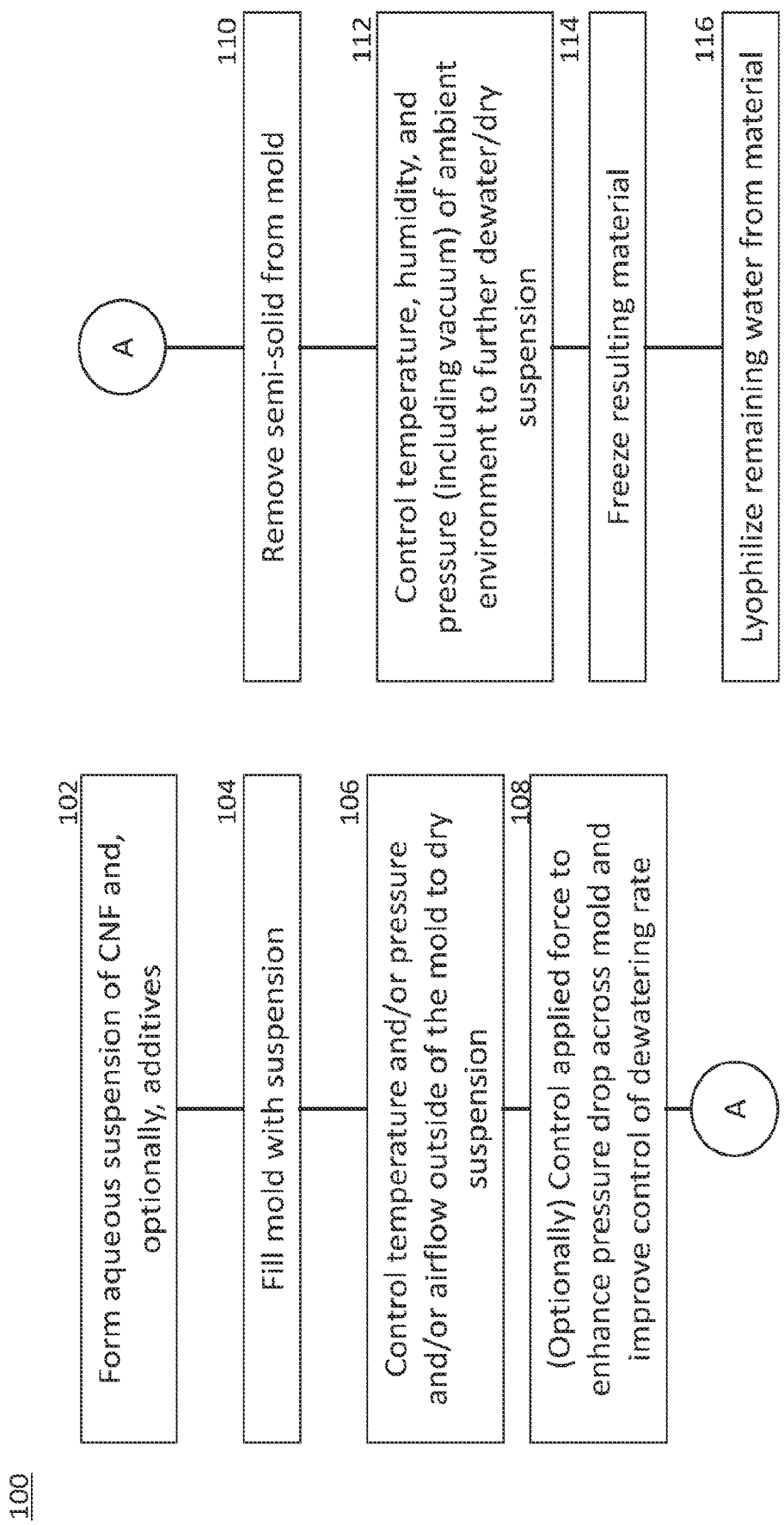
FIG. 11 shows an exemplary flow chart depicting some embodiments of provided methods.

In accordance with various embodiments, the present invention also provides methods for, inter alia, fabricating porous nanocellulose materials including the steps of placing an aqueous suspension comprising nanocellulose fibrils in contact with a first surface of a porous dewatering material, and removing at least a portion of the water in the aqueous suspension via capillary action thereby forming a porous nanocellulose material, wherein the removing step continues for at least 8 hours. FIG. 11, in an effort to improve the clarity of certain provided methods, illustrates certain embodiments of the methods described herein and below.

Figure 4A:
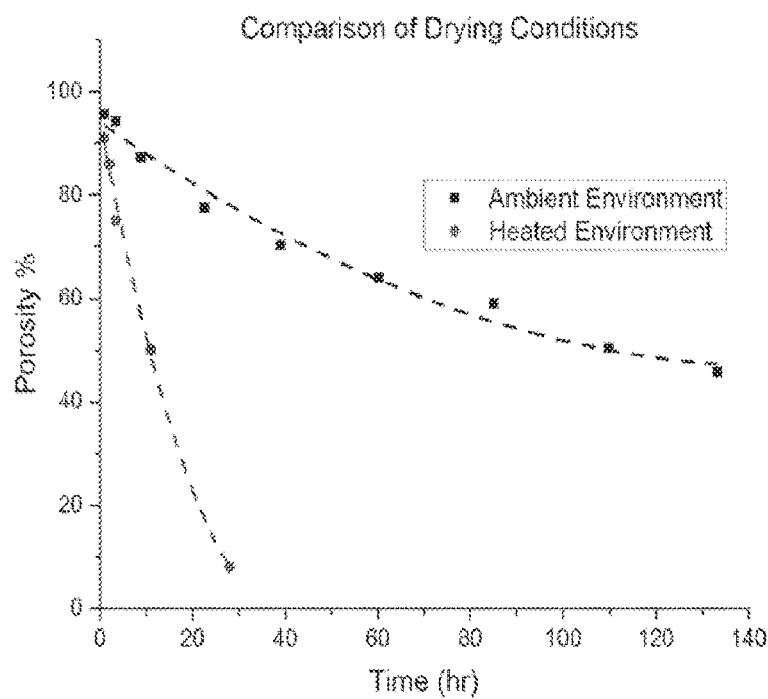
FIG. 4A is an exemplary graph of porosity as a function of drying time in ambient and heated environments, according to an illustrative embodiment.
Figure 4B:
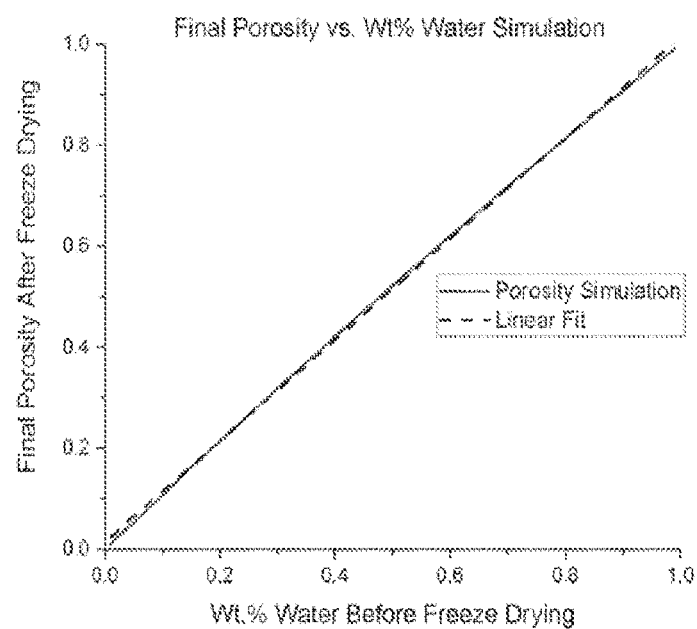
FIG. 4B is an exemplary graph of final porosity after freeze drying as a function of pre-freeze drying water content (wt %).

In some embodiments, the present invention relates to a device and process for efficiently drying or dewatering (the two terms are used interchangeably herein) suspensions that, for example, contain CNF solids initially at only 1 to 10 wt % to achieve CNF solids that are nominally free of water, porous with about 10 to 95% (by volume) porosity, and exhibit a high degree of intermolecular CNF to CNF hydrogen bonding (e.g., wherein the number of intermolecular hydrogen bonds in the composition that are nanocellulose fibril to nanocellulose fibril hydrogen bonds, are, per kilogram of material, between 2 and 10,000 times greater than that of Kraft pulp). Both "hydrogel" and "slurry" may be used interchangeably with "suspension" in referring to a mass of nanocellulos solids in an aqueous suspension. This dewatering and pore formation may occur in multiple "stages" as described herein, and subsequent optional drying steps may also be used to achieve up to about 95 wt % solids. The relationship between water content (inverse of fiber content) of the suspension and porosity of the structural product is nearly linear as shown in FIG. 4B.

In accordance with various embodiments, provided methods include the use of capillary action to dewater a suspension containing CNF solids (e.g., by placing an aqueous suspension comprising nanocellulose fibrils in contact with a first surface of a porous dewatering material). Without wishing to be bound by a particular theory, it is likely that the gentle and controlled nature of capillary forces allow for production of provided materials, as opposed to the much harsher methods used previously (e.g., hot press molding, etc) in an attempt to achieve higher proportions of solids, for example, in solution. In some embodiments, the manipulation of pressure and/or temperature occurs in an area where the aqueous suspension is present. In some embodiments, the manipulation of pressure and/or temperature occurs in an area that is separated from the aqueous suspension by, inter alia, the porous dewatering material. In some embodiments, modulating the temperature comprises raising the temperature. In some embodiments, modulating the temperature comprises lowering the temperature. In some embodiments, modulating the pressure comprises increasing the pressure. In some embodiments, modulating the pressure comprises lowering the pressure. In some embodiments, the pressure is lowered to substantially a vacuum.

Another advantage of some embodiments is that provided compositions may be generated and then put through the process again after, for example, being submerged (wholly or partly) in another (e.g., second, third, etc) aqueous suspension, in order to produce more complex compositions. In some embodiments, provided methods further include the steps of immersing the porous nanocellulose material in an aqueous suspension comprising water and nanocellulose fibrils, and removing at least a portion of the water in the aqueous suspension via capillary action thereby forming a second porous nanocellulose material, wherein the removing step continues for at least 8 hours. In some embodiments, the porosity of the porous nanocellulose material and the second porous nanocellulose material are different. In some embodiments, the porous nanocellulose material and second porous nanocellulose material may be or comprise distinct layers. In some embodiments, the porous nanocellulose material and second porous nanocellulose material are distinct portions of a single continuous composition. In some embodiments, the second porous nanocellulose material completely envelops the porous nanocellulose material. In some embodiments, the porosity of the porous nanocellulose material is higher than the porosity of the second porous nanocellulose material. In some embodiments, the porosity of the porous nanocellulose material is lower than the porosity of the second porous nanocellulose material.

Mold Materials and Properties

In some embodiments, provided methods may use a mold or other vessel (e.g., a belt, wheel or other continuously moving object) as the porous dewatering material. FIG. 1 illustrates a chamber or mold 10 that is useful in some embodiments for rapid dewatering of CNF. The mold 10 may have any desired cross-sectional shape (including square, rectangular, oval, or circular), although a cylindrical mold 10 with a constant circular cross section is illustrated for convenience.

In this example, the mold 10 comprises one or more walls 12 that divide the interior 14 from the exterior 16. The walls 12 have a longitudinal or axial dimension H in a Z direction, and a thickness, t. Depending on the mold cross-sectional shape, the mold will have other dimensions in X and Y directions substantially normal to H, such as diameter(s) or length and width, not identified in the figure. The walls 12 define an interior 14 that is open at at least one end for insertion of CNF suspension to be dried. End covers, 18a, 18b close the open ends of the hollow chamber. At least one end, and optionally both ends 18a, 18b, are moveable within the interior 14, such that a force, F, may optionally be applied (e.g., axially) to compress material within the interior 14. Such a force may be supplied by any mechanism, such as, for example hydraulic pistons or stepping motors, both known and conventional for such purposes. The ends 18a, 18b may include seals for sealing engagement with the interior walls of the mold 10.

In this example, the walls 12 are made of an inert, thermally stable, hydrophilic and porous material. When placed in direct contact with the CNF suspension, the pores of the porous material generate a capillary force that withdraws water from a suspension placed in the interior toward the exterior through the thickness, t, of the walls 12, as is described in detail below. In one embodiment, the mold 10 has a conical bottom end 18b, that may assist in keeping the hydrogel in contact with the mold walls as the mass contracts.

While any application-appropriate porous dewatering material may be used in accordance with various embodiments, Firebrick is one porous dewatering material that is useful in practicing the invention. Firebrick, also known as refractory brick, is a porous block of refractory ceramic material used in lining furnaces, kilns, fireboxes, and fireplaces. Other porous materials suited to practicing various embodiments of the invention include, but are not limited to: kiln bricks, plaster-of-Paris (and other porous ceramics), or any other robust inert, thermally stable, hydrophilic material with an interconnected pore network of relatively low tortuosity. A rank order of some such materials in terms of higher porosity to lower porosity is firebrick~kiln brick>cinderblock>terra cotta ceramics>plaster-of-Paris.

For use in certain embodiments of the present invention, such porous mold materials may have the following exemplary physical properties:

wall thickness, t, varying from about 1 cm to about 100 cm;

hydrophilicity or wettability, as measured by contact angle, $\theta$, at a water-air interface, of about 0 to about 30 degrees, more typically from 1 to about 20 degrees;

pore size, as modeled by average pore radius, r, of a cylindrical pore, which may range from about 5 $\mu$m to about 200 $\mu$m; and tortuosity, $\tau$, as modeled by the ratio of arc length, L, to chord length, C, (i.e. L/C) of about 1 to 100.

The exemplary porous mold described herein 10 may be surrounded with other components, illustrated in schematic form in FIG. 1, that control the environment around the mold. "Controlling the environment" around the mold, as used herein, refers to the control of the mold temperature directly or indirectly by control of the pressure, temperature and/or air flow rate around the mold (i.e., at a second surface of the porous dewatering material). For example, one or several heating elements 20 may be built into or surround the walls 12 for directly heating the mold 10, and/or the surrounding environment, in a controlled manner. The heating elements 20 may be resistive or convective in design. Furthermore, air flow around the exterior 16 of the walls 12 may be controlled as well. Fans or blowers 22 may be used to control airflow around the exterior 16 of walls 12. Conduits, baffles and/or deflectors may also be employed to control the route and velocity of the air as it flows around the mold walls. The air flowing around the walls may be heated to apply heat to the mold 10, or chilled to apply cold air to the vessel as desired. Alternatively, the mold may physically be moved to an oven or a refrigerator for heating or cooling, respectively. The importance of such "control of the environment" is discussed further below.

In accordance with various embodiments, the rate of water withdrawal is governed generally by pressure and enthalpy gradients, and may include 1 to 3 "stages" Enthalpy gradients are discussed later, in connection with stage 2 drying. Unless otherwise specified, pressure gradients refer to the difference between pressure inside the mold relative to pressure outside the mold and are predominantly manipulated in stage 1 drying, in various embodiments. There are three pressures to consider overall as a specific provided method is considered for use: the optional applied force, F; the hydrostatic pressure, and capillary pressure. The first two—applied and hydrostatic—may be combined and considered as internal pressures that "push" fluid out of the mold, while the last may be considered a force that "pulls" water out of the mold. Balance of this push and pull is important to control the rate of dewatering and thereby modulate the formation of a network of fiber-fiber hydrogen bonds. It is important to note that the application of applied force is entirely optional to several embodiments.

Stage 1

Hydrostatic pressure is well known as the force applied by gravity on the mass of a column of water. The effect of gravity on the top end cover 18a of the exemplary mold configuration described herein may be considered a positive applied force, but additional applied pressure may be positive or negative in sign, thus increasing or decreasing the effect of gravity on the end cover 18a. In general, for various embodiments, the applied force is minimal in comparison to capillary pressure. According to some embodiments, the optional external force is typically an order of magnitude (or more) smaller than the force resulting from capillary action alone. As such, it is apparent that the applied force has only a nominal effect on the dewatering process, but rather is used to help establish uniform pressure throughout the hydrogel (Pascal's Principle) as well as minimize the formation of unwanted void spaces during the water removal process.

While other forces may optionally be employed, water removal is principally dependent on the capillary pressure, or wicking, that draws water out of the suspension through the pores of the porous mold. Capillary pressure is governed mainly by the pore characteristics (e.g. size and tortuosity), the wettability and thickness of the mold material. This may be modeled by the Young-Laplace equation:

$$\Delta P = \frac{2\gamma \cos\theta}{r};$$

where $\Delta P$ represents the pressure difference across a curved fluid-air interface, such as the water meniscus within the pores of the mold; the contact angle, $\theta$ represents the wettability of the mold material; $\gamma$ is the surface tension of the fluid, and r is the capillary radius. This difference in pressure is responsible for 'pulling' the fluid from the inside of the mold 14, through the pores in the mold walls, to the outside of the mold where it can simply run off or, providing additional control, evaporate. If the external applied force F is nominally zero (e.g., if the top endcap 18a is held fixed at the suspension surface but does not apply the force of its own weight to the suspension), then the familiar capillary rise approximation to the Young-Laplace equation can be used (shown here for a highly wetting, low contact angle surface; $\cos\theta \approx 1$):

$$\Delta P = \frac{2\gamma \cos\theta}{r} \approx \frac{2\gamma}{r} \rho g h$$

where $\rho$ is the density of the fluid, g is the gravitational constant, and h is the capillary rise height necessary to balance the capillary pressure difference. By rearranging this function and replacing h (height) with t (thickness) we can approximate the desired (maximum) mold thickness for a given material having unique, known wetting (contact angle) and pore size (r) characteristics:

$$t_{max} = \frac{2\gamma}{\rho g r}$$

such that fluid in the pores of the mold material will just reach the outer surface of the mold, whereby efficient evaporation can take place. If the thickness of the mold material, under these conditions is greater than $t_{max}$, efficient surface evaporation will not be achieved and dewatering will be very slow. If a thinner material is instead selected, surface run-off will occur and dewatering can be accelerated, provided the surface excess is continuously removed. It should be noted that this model assumes well-behaved cylindrical pores with minimal tortuosity ($\tau < 100$), and tends to overestimate the maximum desired mold thickness, under these conditions.

In typical operation of some embodiments of the present invention, a force (F in FIG. 1) is applied. The magnitude of this force is (typically) minimal due to gravity acting the mass of the topmost mold endcap, but can be decreased or increased if desired. Under these conditions, according to Pascal's Principle of hydraulics, the pressure inside of the mold is the same everywhere and equal to the applied force, F, over the area, A, of the endcap. This additional pressure can be included in our thickness estimation:

$$t_{max} = \frac{2\gamma}{\rho g r}\left[\frac{2\gamma \cos\theta}{r} + \frac{F_{applied}}{A_{endcap}}\right]$$

It is worth noting, that the simple cylindrical capillary model will be only an approximation, in part due to the fact that gravitational force directly opposes the rise in a capillary tube, but has a more variable impact on flow through the pores in a mold, which may widely vary in direction relative to gravity. However, an effective minimum thickness may be determined empirically and can be significantly less than predicted by the above theoretical approach. A modified functional form, including a flow restricting term such as tortuosity ($\tau$) that is generally larger than 1, can then be described;

$$t''_{max} = \frac{1}{\tau \rho g}\left[\frac{2\gamma \cos\theta}{r} + \frac{F_{applied}}{A_{endcap}}\right]$$

In this way, efficient dewatering can be achieved using mold materials of greater thickness with varying wettability ($\cos\theta$ and $\gamma$), or with different pore characteristics (r and $\tau$).

For reasons discussed below, in some embodiments the internal pressure is less that the capillary pressure, by 1-2 orders of magnitude in extreme cases. Thus, a ratio of the capillary pressure to the combined internal pressure is typically greater than 1.0, but may be balanced to range from about 0.1 to 100, for example from about 0.5 to about 50, about 0.5 to about 20, or from about 1 to about 10.

The time to dewater a hydrogel may be greatly accelerated, in some embodiments, as compared to ambient drying in accordance with various embodiments. The wicking action modeled by the Young-Laplace equation described above, in the absence of other forces, produces a dewatering time that can be described reasonably well using the Lucas-Washburn equation:

$$t = \frac{4L^2\eta}{2\gamma r}$$

where t is the time it takes a fluid of viscosity $\eta$ and surface tension $\gamma$ to travel length L in a cylindrical capillary of radius r. For a typical mold material (e.g. wherein L=30 mm, r=10 microns), according to the LW equation, the entire length of the pore is filled within only a few seconds. If we include the material tortuosity ($\tau$), then we can relate the pore length to the actual mold wall thickness: $L=\tau''_{actual}$, and we see the important quadratic effect that tortuosity has on this time, increasing t to a few hundred seconds. In experiments by the inventors using a 5 gallon size mold filled with a CNF slurry that was about 95 wt % water, they discovered that capillary action alone (F=0) would withdraw about 2 gallons of water from the slurry in the mold within a few minutes.

In reality, the LW equation only accurately describes this initial time period, where the water content of the hydrogel is above 95 wt %, and can be viewed primarily as a well behaved bulk fluid (water). For example, in the aforementioned experiments with a 5 gallon size mold, water removal rates are significantly lower after an initial period. As the water content is further reduced, a CNF-CNF and CNF-water hydrogen bonding network is established, making it increasingly difficult for fluid water to move through this network. A complete theoretical model for water removal would need to include this pore network, and how it changes over time, in addition to that of the mold wall. Empirical results of this effect can be seen in FIG. 4A, where the apparent slowed rate of water removal is evident under ambient conditions, but accelerated at elevated temperatures. This effect on water removal rate is exacerbated as water content drops to <85 wt % u, the mean distance between individual CNF particles decreases, and the CNF-CNF hydrogen bonding network becomes well-formed leaving smaller more tortuous pore spaces through which water must move. Transport of water through such a network becomes increasingly hindered, particularly when using previously known methods of dewatering.

The ability to modulate the dewatering rate by balancing the internal pressure with the capillary pressure is another advantage of the invention. Although faster dewatering might be accomplished by increasing internal pressures, it is favorable final product mechanical properties (strength, hardness, etc.), that must be maximized in accordance with various embodiments. Accordingly, controlled modulation of dewatering is necessary to allow formation of the intermolecular CNF to CNF hydrogen bonding network that achieves these desirable properties. Drying might be viewed as a process not only of removing water, but also of breaking fiber-water hydrogen bonds and forming fiber-fiber hydrogen bonds. During this stage 1 process, the individual CNF molecules must be able to move (i.e. rotation, flex, bend), in such a way as to sample their local environment and find those points of contact with other CNF molecules that maximize the total bond energy of the entire CNF-CNF hydrogen bonding network. If the water removal process proceeds too quickly, the CNF molecules are inhibited from moving and cannot establish an optimal hydrogen bonding network, resulting in a relatively weak and inferior material. Typical times for this network to be established are in the range of 8-36 hours, depending on the desired final product porosity. At the end of stage 1, the material can be viewed as an established, and in some embodiments, may be a water swollen (typically still 90-75 wt % water) semi-solid CNF-CNF hydrogen bonding network.

At this point in the process, where the pores of the mold are filled with water, the capillary induced forces are diminished. In order for additional water to be removed, additional forces must be employed. In the present invention, this can be achieved by either, or both, increasing the applied for (F), effectively squeezing water out of the CNF, or by continuously evaporating water from the outer surface of the mold, which allows capillary action to continue. While the former can be implemented up to a point (<50 wt % CNF), the latter shows better control and final product quality. Additionally, the CNF solid pore network, hence the mechanical properties of the final material, may be adversely affected when only the compressive force approach is used. This is one reason why many previously known methods fail to provide compositions such as those described herein.

In some embodiments, heat and/or airflow can be implemented to maintain a higher water evaporation rate from the external surface of the mold. In some embodiments, pressure (e.g., vacuum) may be used to maintain a higher water evaporation rate. Heat, airflow, and/or pressure may be applied locally to the external surface of the mold. The use of heat, airflow, pressure, or combinations thereof to maintain an elevated water evaporation rate combines capillary action, hydrostatic pressure, and the enthalpy of vaporization of water to achieve a more rapid and/or complete dewatering. An example is shown in FIG. 4A, where the drying time and resulting solid form porosities are compared for a heated and non-heated conditions. Heated wicking may be employed when mold design is such that capillary pressure rapidly draws water through the entire pore structure to saturate the mold. Without wishing to be held to a particular theory, it is contemplated that, without increased evaporation, the dewatering process would slow tremendously after this quick initial phase.

In accordance with some embodiments, an aqueous CNF suspension is placed inside a mold 10 and the ends 18 are closed. An external force may optionally be applied, but the capillary pressure gradient described above pulls water through the walls 12 from the interior 14 to the exterior 16 where it may flow away or evaporate, depending on the properties of the porous mold, as noted above.

Figure 10:
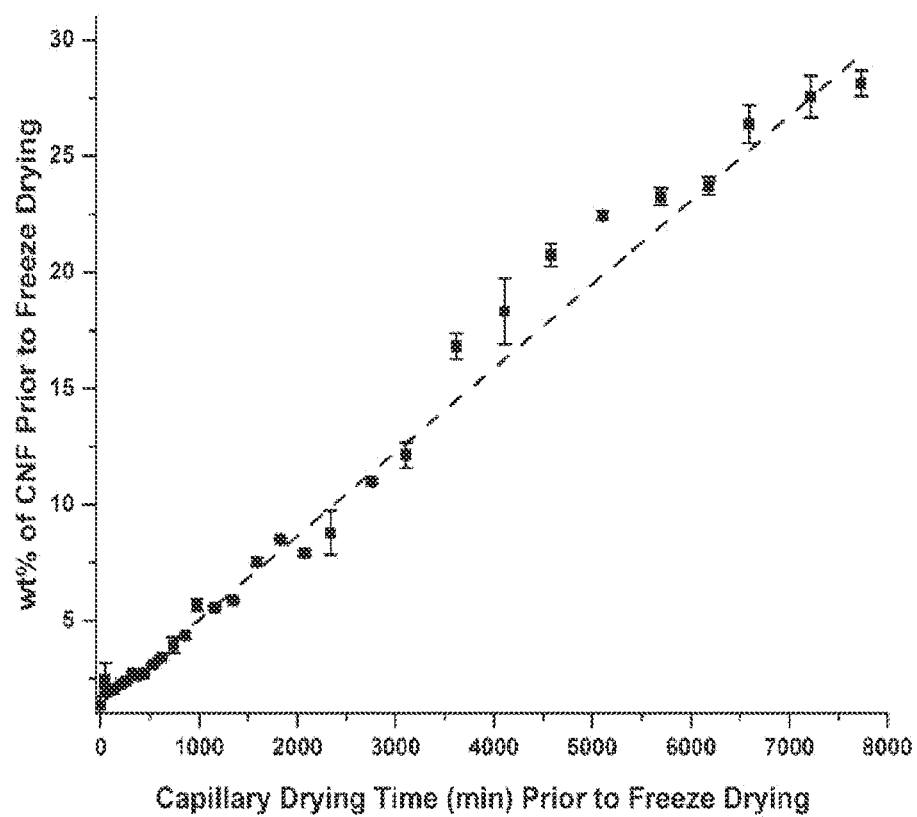
FIG. 10 shows a graph of wt % of CNF in stage 1 drying under ambient conditions (25° C.) as a function of drying time in minutes.

Use of a porous dewatering material, such as the mold as described above, defines stage 1 of the overall drying process and is the only step essential to the methods provided herein. Stage 1 drying may dewater the suspension to a CNF solids content of about 5 wt % to about 95 wt %, for example from about 5 wt % to about 15 wt %, or from about 15 wt % to about 25 wt %, or as described elsewhere herein. FIG. 10 provides an exemplary graph showing the wt % of CNF solids after stage 1 drying over time.

Optional "Stage 2"

In some embodiments, provided methods further include the steps of separating the porous nanocellulose material from the first surface of the porous dewatering material, and further drying the porous nanocellulose material. In some embodiments, the further drying results in a porous nanocellulose material comprising a nanocellulose solids content from about 15 wt % to about 95 wt %.

Figure 3:
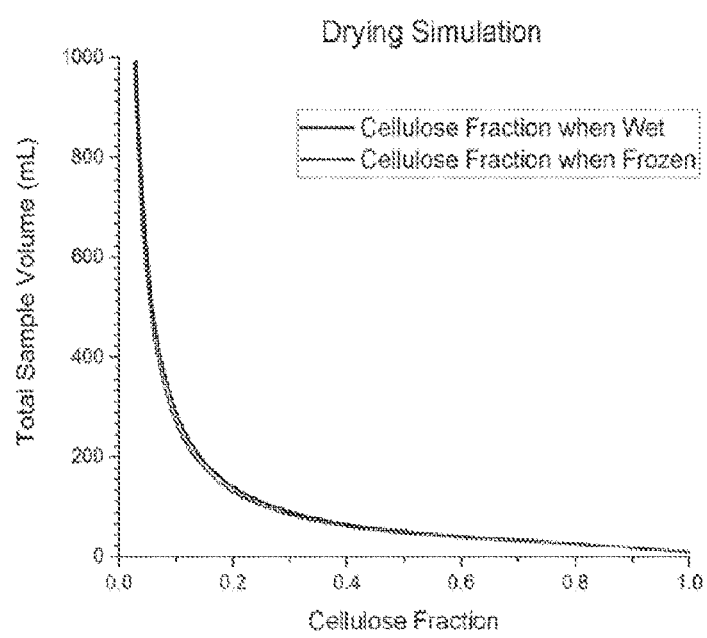
FIG. 3 is an exemplary graph showing change in sample volume with cellulose fraction (wt %) in wet and frozen conditions, according to an illustrative simulation.

Further drying may optionally take place by other methods in conjunction with the "stage 1" drying described above. For example, in an optional second stage, the porous nanocellulose material (e.g., which may be a semi-solid) is removed from the porous dewatering material (e.g., a mold/press, belt, wheel or other continuously moving object) and suspended in a controlled temperature and humidity environment, whereby continued water removal is achieved by evaporation, until the solids content is from, for example, about 25 wt % to about 95 wt %, depending on application and desired pore size of the structural product. As the CNF is dewatered, its volume decreases significantly. FIG. 3 illustrates the theoretical relationship between CNF solids content and volume. For example, a 1 L sample of ~3 wt % CNF solids shrinks down quickly to below 200 mL when dried as far as 15-20 wt % CNF solids (typically in stage 1), and then shrinks much more slowly as it further dries. Controlled humidity may range from about 80% to about 40 wt % water (relative humidity).

During stage 2, in some embodiments, water removal is best modeled by the enthalpy of vaporization of water ($\Delta H_{vap}$), where primarily water-water hydrogen bonds must be broken. The time constant for this process is significantly increased due to hindered transport through the CNF network, relative to an open water surface, but can still be dramatically reduced at elevated temperatures (typically 25-65° C.). Below 40 wt % water, the water removal process is further hindered as the CNF-CNF network continues to contract, leaving only micropores for water transport. Additionally, much of the remaining water is associated with the CNF network through CNF-water hydrogen bonds, which, in some embodiments, requires additional energy for removal. Below about 5 wt % water, complete and permanent water removal is extremely difficult as, without wishing to be bound by any theory, it is possible that the released water molecules move in a stick-release pattern from one CNF to another open CNF hydrogen binding site.

Depending on the final desired porosity, Stage 2 water removal can be ended at any point, and complete water removal, at a fixed final porosity, can be achieved, for example, through Stage 3 freeze-drying. FIG. 4B illustrates the theoretical correlation of wt % CNF solids at stage 2 with final porosity upon freeze-dried fixation in a stage 3.

In accordance with various embodiments, a unique feature of the dried CNF of provided compositions can be the homogeneity of its porosity, if water equilibration is allowed. When CNF slurries are dried in ovens or in air, gravity or skin formation causes the final porosity to be very heterogeneous within the layers of the dried mass. The present invention is capable of drying to a more uniform porosity, if desired, by wicking water in all directions from a suspension in a porous mold.

Figure 2:
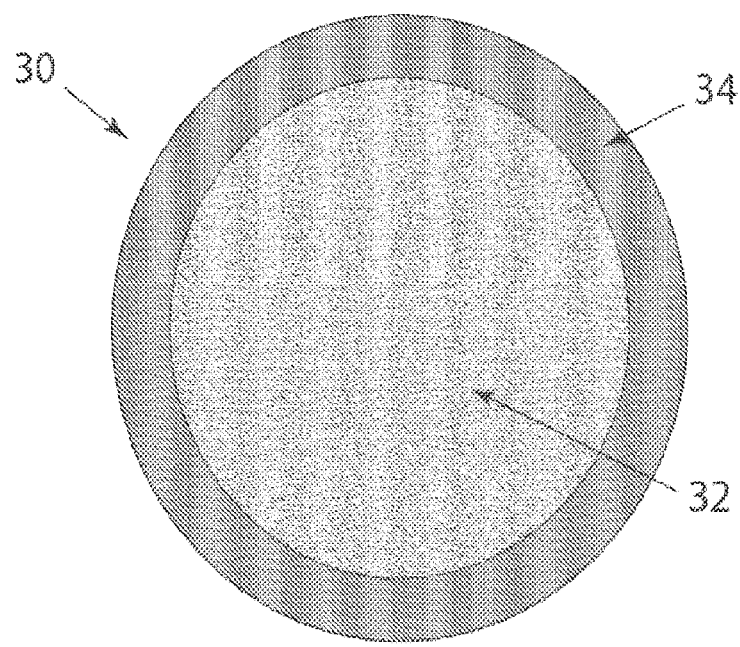
FIG. 2 is a schematic cross-sectional representation of a dried, porous structural product, according to an exemplary embodiment.

Alternatively, in some embodiments, a unique, engineered product can be made if the CNF is initially dried actively or passively according to the invention until an intermediate dryness, and then is removed from the mold and quickly dried further by application of heat and/or air to the exterior only of the molded product. This produces a homogeneous porosity at one level throughout a central portion bounded by a harder, more dense (or less porous) layer or shell around the exterior. FIG. 2 illustrates a cross section of such a material 30 having a more porous core 32 surrounded by a less porous, denser coating layer 34. Such a structure is not unlike the cortical bone layer surrounding a trabecular or spongy bone interior. Structures having a harder outer shell like this may be more resistant to degradation in the body, or may be more amenable to controlled dissolution kinetics, compared to structures without such shells.

In some embodiments, a more dense outer coating, composed of CNF, CNC or other cellulose based polymeric material, may, if desired, be applied on top of the structural CNF product. For example, a carboxymethylcellulose coating may be applied to give the structural material a smooth, finish coat. Such exterior coatings may also impart hydrophobicity if desired. This coating may be applied before or after an optional stage 3.

Optional "Stage 3"

In some embodiments, provided methods further include the steps of freezing remaining water in the porous nanocellulose material, and evaporating the frozen remaining water from the porous nanocellulose material.

A stage 3 freeze-drying or lyophilization process may optionally be used to remove remaining water and create a more stable porous solid form. The water removal process may be arrested at any point in stages 1 or 2, and the CNF solids wt % in these stages may be directly correlated to a dry final (post stage 3) porosity (volume %). FIG. 4B illustrates the theoretical correlation of wt % CNF solids and porosity. Note that the relationship is not precisely linear due, at least in part, to the small volume change as water transitions from a liquid to a solid. This process thus allows for very precise control of porosity level in the finished product. The freeze dry process is achieved by flash freezing the water-bearing semi-solid/solid at the desired water content, which, in some embodiments, locks in the pore network at any desired level of porosity. Then, the water removal process (e.g., to about 0.01 to 2 wt %) may be completed through vacuum evaporation. Generally, such low water contents are maintainable only in controlled humidity environments as these products may extract water from ambient air. The effect of freezing and ice expansion on the wet CNF wt % and, by extension, on the final porosity of the product is well understood and nearly insignificant, as indicated in FIG. 3.

Solid forms exhibiting hetero- or homogeneous porosities are also achievable in such a controlled manner. Homogeneous porosities are achieved by first allowing for water content to equilibrate throughout the material before vacuum drying. In contrast, variable porosities are achieved by control of accelerated stage 2 drying Stepwise variable porosities are also achieved through the addition (by dipping, spraying or otherwise coating) of CNF layers, before or after the aforementioned stage 3 water removal process.

Although cylindrical molds and solid forms have been exemplified herein, it should be understood that any shape solid form may be produced by the invention. Exemplary forms include spheres, cylinders, cones, cubes, boxes, and sheets or thin films. Moreover, porous dewatering materials (e.g., molds) and resulting solid forms may be regular or irregular in shape. In some embodiments, shapes may be modified or altered relative to the mold shape if, between stage 1 and stage 2, a semi-solid mass is removed from a mold while it is still somewhat malleable (e.g. up to about 20 wt % solids). It may then be shaped into a non-mold shape before it is dried to completion in subsequent stages.

Porosity

As discussed herein, provided methods allow for the production of compositions (e.g. biocompatible and/or biodegradable compositions) having any of a variety of customizable porosity profiles.

One of the advantages of various embodiments of the present invention is the very high degree of control over the porosity of provided compositions that are made possible via the methods provided herein. For example, in some embodiments, provided methods and compositions may allow for precise control over one or more of: the degree of porosity, the distribution of the porosity, the size of the pores, the spacing of the pores, and the shape of the pores. In some embodiments, provided compositions may have a porosity of between about 5 vol % to about 95 vol %, inclusive. In some embodiments, the porosity of provided compositions is homogeneous. In some embodiments, the porosity of provided compositions is heterogeneous. In some embodiments, the porosity of provided compositions comprises a gradual or stepwise variation of porosity within the composition.

In accordance with various embodiments, any level of porosity in a provided composition is achievable using the methods described herein. By way of non-limiting example, in some embodiments, provided methods and composition may include material exhibiting a high degree of porosity (e.g., greater than 50%, 60%, 70%, 80%, or 90%). For example, in some embodiments, provided methods and composition may include material exhibiting a low degree of porosity (e.g., less than 20%, 15%, 10%, or 5%). For the avoidance of doubt, in some embodiments, provided compositions may exhibit a level of porosity between 20 and 50%, inclusive.

In accordance with various embodiments, provided methods and composition may include any of a variety of pore sizes. By way of non-limiting example, pore sizes achievable in accordance with provided methods includes pores having a diameter (or other appropriate cross sectional measurement) of between 10 nm and 5 mm. In some embodiments, provided methods and compositions may include pores with a diameter (or other appropriate cross sectional measurement) of between 100 nm and 5 mm, 1 uM and 5 mm, 10 uM and 5 mm, 100 uM and 5 mm, 10 nm and 3 mm, 100 nm and 3 mm, 1 uM and 3 mm, 10 uM and 3 mm, 100 uM and 3 mm, uM to mm, 1 uM to 100 uM, 1 nm to 1 uM, etc, inclusive.

In some embodiments, total porosity versus pore size distribution may be modulated as desired for a particular embodiment. Specifically, in some embodiments, gradual dewatering (e.g., conditions including temperatures of approximately 25-60° C., atmospheric external pressure (~1 bar), and/or mild air flow) yields pore size distributions such as those shown in FIG. 5. Alternatively, if the temperature is increased to approximately 40-90° C., and/or the external pressure is decreased (e.g., if you create a vacuum of less than 1 bar, down to as low as approximately 10 mbar), then provided methods may be used to achieve a very broad pore size distribution that includes pores as large as millimeter scale. Interestingly, in some embodiments, creation of these larger size pores results in the formation of thicker, non-porous "webs" between the pores, which can result in an extremely strong material, significantly stronger than the more homogeneous smaller pore materials in FIG. 5, even when the total porosity of the two materials is identical.

Additives

In accordance with various embodiments, it is also possible to incorporate various additives or dopants into the CNF suspension prior to or after drying. In some embodiments, useful additives may impart, for example, different physical and/or chemical properties to the CNF once dried, but do not substantially alter the mechanical properties. In some embodiments, provided compositions comprise at least one additive. In some embodiments, provided compositions comprise two or more (e.g., 3, 4, 5, 6, 7, 8, 9, 10 or more) additives.

In some embodiments, provided compositions further comprise at least one additive. In some embodiments, the at least one additive is or comprises a nanomaterial or polymer (e.g., carboxymethyl cellulose (CMC)). In some embodiments, the nanomaterial is or comprises a nanoparticle, nanosphere, a nanostar, nanowire, and/or a nanorod. In some embodiments, the nanoparticle comprises at least one metal or polymer (e.g., carboxymethyl cellulose (CMC)). In some embodiments, the at least one metal comprises gold, silver, platinum, any ferromagnetic metal, titania, copper, and combinations thereof. In some embodiments, the at least one additive is or comprises a mineral. In some embodiments, the mineral is selected from hydroxyapatite, calcium phosphate, and combinations thereof.

According to various embodiments, additives may be used in concentrations varying from about 0.01 wt % to about 90 wt % of the overall composition. For example, in some embodiments, provided compositions may comprise one or more additives at a concentration of at least 0.01 wt %, 0.1 wt %, 1.0 wt %, 2 wt %, 5 wt %, 10 wt %, 15 wt %, 20 wt %, 25 wt %, 30 wt %, 35 wt %, 40 wt %, 45 wt %, 50 wt % or more. In some embodiments, provided compositions may comprise one or more additives at a concentration in one or more of the following ranges 0.1 to 90 wt %, 1.0 to 90 wt %, 2 to 90 wt %, 5 to 90 wt %, 10 to 90 wt %, 20 to 90 wt %, 30-90 wt %, 40-90 wt %, 10 to 80 wt %, 10 to 70 wt %, 10 to 60 wt %, 10 to 50 wt %, 10 to 40 wt %, 10 to 30 wt %, 10 to 20 wt %, 1.0 to 20 wt %, and 0.01 to 20%, inclusive.

A non-limiting example of an additive that imparts a different physical property is the addition of super-paramagnetic iron oxide nanoparticles (SPMNP) to the CNF suspension. As the suspension is dried, the SPMNP become trapped within the nanocellulose and pore network throughout the solid, and permit imaging of the structure in-situ by means of magnetic resonance imaging (MRI) equipment. Furthermore, if the product is one designed intentionally to disintegrate over time and be resorbed, this disintegration may be imaged and monitored via the localized loss of SPMNP induced contrast as imaged by MRI. Other examples of additives that affect physical but not mechanical properties are additives impacting optical or electronic properties.

An example of an additive or dopant that imparts a change in a chemical property is the addition of a reagent to the CNF structure. Reagents in biomedical applications may include drugs such as antibiotics, growth factors, immune suppression drugs or other pharmaceutical agents. Reagents in diagnostic applications may include analyte capture reagents such as antibodies or fragments thereof. Reagents in environmental applications may include any chemical reagents known to react with and detect the presence of an environmental contaminant or other analyte. Through the control of disintegration characteristics and porosity, these reagents may be gradually released into the surroundings.

In some embodiments, provided materials and/or methods may include additives comprising one or more minerals. Minerals for use in the methods described herein, can include any biocompatible mineral that one desires to use. A preferred mineral is hydroxyapatite, which has well-known characteristics with respect to its compatibility with bone. Hydroxyapatite particles of varying size can be used to synthesize an implantable structure, and are available in nanocrystal, powder, granules and blocks from commercial sources such as Berkeley Advanced Biomaterials (Berkeley, Calif.). The size of hydroxyapatite particles can vary widely depending on the material properties desired following dewatering of provided biocompatible materials. The particles of hydroxyapatite can be, for example, nanoparticles or alternatively, can be very large, for example, 500 µm and up to millimeter sizes. In some embodiments, the size of particle used will alter the properties of the article of manufacture, such as compressive modulus, shear bond strength and porosity. Methods for use of a variety of hydroxyapatite particle sizes are contemplated herein.

Other dopants or additives are certainly known to those skilled in the art and could be considered for addition to the structural products of the invention without deviating from the scope of the invention.

Commercial Uses of Nanocellulose Based Porous Solids

Nanocellulose fibers are finding utility as additives in the paper and paperboard industry. However, the time required to gradually remove water, and limitations on the extent of formation of a strong hydrogen bonding network have severely limited the application of previously known CNF solids. Additionally, previously realized CNF solids were unable to achieve porous structures with engineerable mechanical properties, porosity, density, homogeneity, or water content such as those of compositions provided herein. The ability of this invention to more rapidly dewater the suspensions of CNF, in a highly controlled (e.g., engineered) manner, while still generating strong materials, make larger scale production of CNF porous solids possible, thus enabling many new applications that previously would not have been economically feasible. The review articles by Lin and Dufresne, and Jorfi and Foster, previously incorporated, give excellent examples of uses of the new materials disclosed herein. Among the many examples of biomedical uses are temporary replacements or scaffolds for bone, cartilage, dermis, vasculature, etc.

In some embodiments, provided materials may be used, inter alia, as orthopedic and other medical products. Non-limiting examples include screws, pins, plates, sutures, cortical plugs/spinal spacers, artificial "skin", meniscus tissue, wicking sensors, silver doped wicks. In some embodiments, provided materials may be used for drug delivery, for example, sustained drug delivery.

Thus, in some embodiments, the invention comprises biocompatible structural products that consist essentially of nanocellulose fibers. The term "consisting essentially of" means that the base products are composed of at least 90.0 wt % (e.g., at least 95 wt %, 99 wt %, or more) nanocellulose. However, "consisting essentially of" does not exclude the presence of dopants or other additives in addition to the base product that are present to impart particular physical or chemical properties to the nanocellulose, as described herein. By "biocompatible" is meant that the base CNF products are "medically compatible" in that they elicit little or no immune rejection response when inserted in or placed in contact with the body; or that they are "environmentally compatible" in that they produce or leave no hazardous or non-biodegradable residue. It is of note that some embodiments comprise provided compositions (e.g., biocompatible structural materials) that are primarily comprised of nanocellulose fibers/CNF (i.e., greater than 50 wt % of the final composition is CNF). In some embodiments, provided compositions that are primarily comprised of CNF include greater than 55 wt %, 60 wt %, 65 wt %, 70 wt %, 75 wt %, 80 wt %, 85 wt % CNF as compared against the weight of the entire composition.

The term "structural" implies that the material is a solid that can be shaped into a useful article having suitable strength properties, including a flexural modulus that may exceed 5000 MPa, depending on porosity, pore size distribution and hydrogen bonding network. In some embodiments, the flexural modulus may range from about 500 to about 1,000,000 MPa, for example from about 1,000 to about 90,000 MPa, from about 1,000 to about 80,000 MPa, from about 1,000 to about 70,000 MPa, from about 1,000 to about 60,000 MPa, from about 1,000 to about 50,000 MPa, from about 1,000 to about 40,000 MPa, from about 1,000 to about 30,000 MPa, from about 1,000 to about 20,000 MPa, from about 1,000 to about 10,000 MPa, or about 2000 to about 10,000 MPa. In some embodiments, provided compositions may exhibit a flexural modulus of less than 500 MPa.

EXAMPLES

Figure 5:
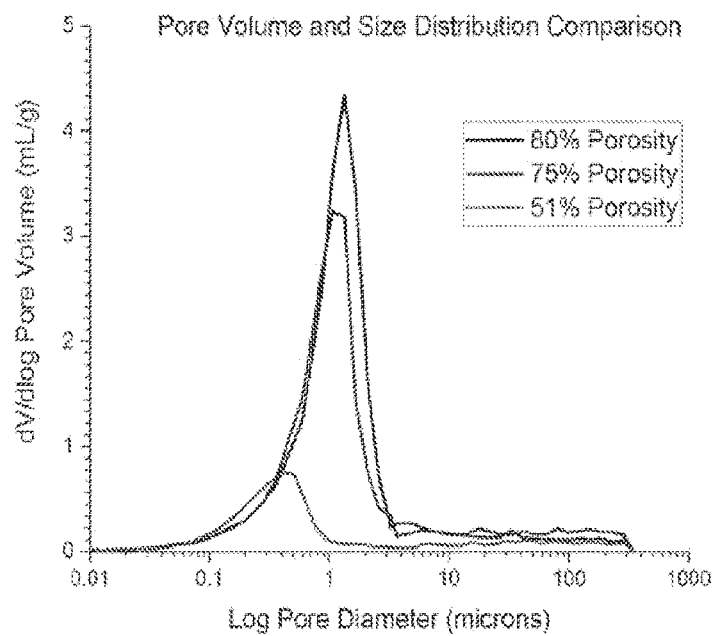
FIG. 5 shows an exemplary distribution of pore size at three different porosity levels as measured with porosimetry.

Example 1: Porosity and Pore Size Distribution Control in Fully Dried Pure CNF Solids Fully dried porous solid samples were generated with three distinct porosity levels (80%, 75%, and 51%). Total porosities were calculated using simple mass/volume/density relationships. For each sample the pore size distribution was measured by standard mercury porosimetry. The data, shown in FIG. 5, are consistent with the independent porosity measurements (shown here as the total area under each curve) and suggest that, in the method used to create these samples, as the total porosity of the CNF solid decreases, the average size of the pores also decreases in a predetermined and controllable manner.

Figure 6:
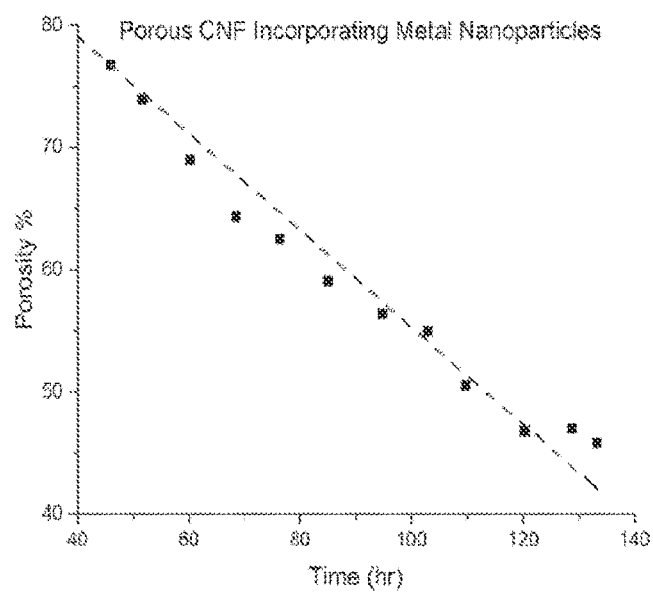
FIG. 6 is a graph of porosity as a function of drying time drying time chart for an exemplary porous CNF material containing a noble metal additive, according to an illustrative embodiment.

Example 2. Highly Porous Entrained Noble Metal Nanoparticle Solids for Use in Fluid Sampling and Sensing Applications Porous CNF solid forms were generated containing silver nanoparticles (mean diameter ~20 nanometers) added as a reagent (0.1 wt %, relative to CNF solids) prior to drying. 10 L of the resulting suspension was dried passively over time, using capillary action and ambient conditions, to result in an optimized balance between moderate porosity (55%-45%) while still demonstrating relatively long-term structural stability when re-wetted. FIG. 6 shows the effect of gradual drying on the final porosity of the solid forms. It should be noted that, at relatively low nanoparticle loading, minimal effect on drying time or final porosity is observed due to the presence of the nanoparticles.

Again porosity was measured, but with a silicon oil technique this time. The sample is dipped in silicon oil and the new mass is calculated to determine porosity percentage. Methods of this type are not uncommon, being cost effective and far less time consuming that the mercury porosimetry described previously. The porosity vs. time results are shown in FIG. 6. Porosity declined from about 95% to about 45% in about 8000 minutes (~134 hours), here the target region of interest (40-80% porosity) is expanded for clarity on the y axis. The drying occurred in an approximately linear fashion over the desired porosity range.

Example 3: Mechanical Properties of Porous CNF Materials

CNF solid products are prepared as described above Samples of varying porosity levels were tested for mechanical strength characteristics using a standard 3-point bend test on an INSTRON instrument.

Figure 7:
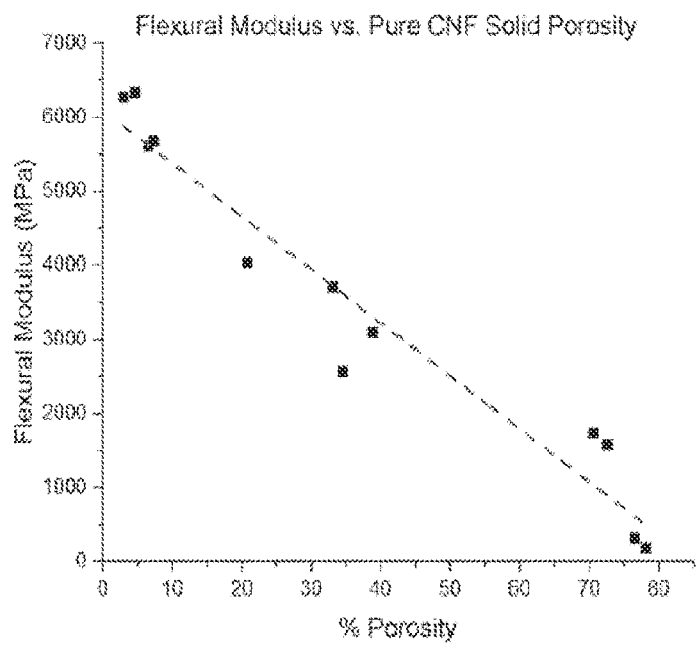
FIG. 7 is an exemplary graph of flexural modulus as a function of porosity for a pure CNF solid.

FIG. 7 shows the flexural modulus of CNF samples at different porosities. These data suggest that, in some embodiments, flexural modulus decreases as porosity increases. This trend is not unexpected. Young's modulus is the ratio of stress to strain in flexural deformation.

Figure 8:
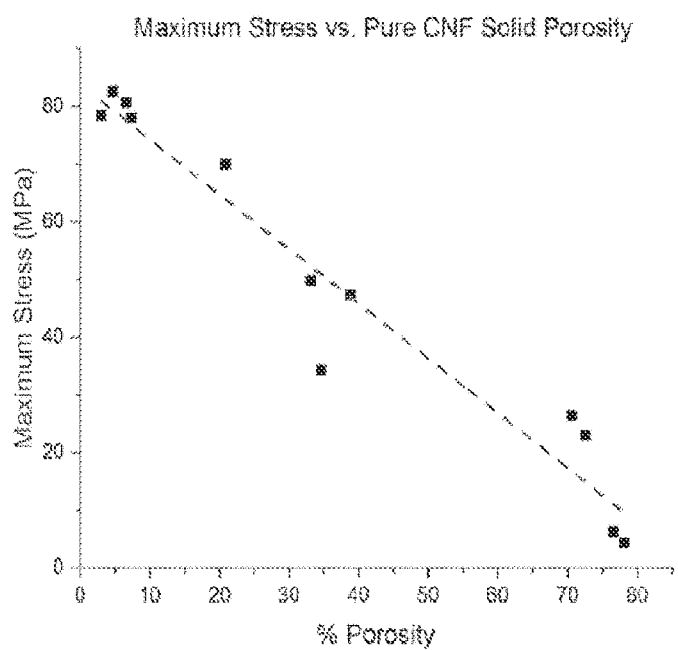
FIG. 8 is a graph of maximum stress as a function of porosity for a pure CNF solid, according to an illustrative embodiment.

FIG. 8 shows the maximum stress of CNF samples at different porosities. The maximum stress, simply put, is how much applied stress the sample was able to withstand prior to structural failure. These data suggest that, in some embodiments, maximum stress decreases as porosity increases. This trend is also not unexpected.

Example 4. Comparative Performance of Porous CNF Materials

Certain embodiments of the methods described herein were used to fabricate porous nanocellulose materials with various mechanical properties and densities. Processing conditions were varied in order to produce samples with varying properties. Resulting materials were cut to a uniform size. Then, the uniform samples were characterized.

Samples were fabricated according to the following method. A suspension of 19 liters of 3 wt % CNF was poured into an assembled mold made of fire brick. Every 24 h, a specimen was gathered from the bulk CNF suspension and its moisture content checked with a moisture content balance. Typical specimen weights were approximately 1 gram. When the moisture content of the bulk suspension reached a desired percentage, a large quantity sample was removed from the bulk suspension and frozen at −80° C. for 24 h. Desired moisture contents were selected based on a desired final porosity, in accordance with the relationship shown in FIG. 4B. In certain embodiments, liquid nitrogen is used for more rapid cooling. The size of the large quantity sample removed was dependent on the quantity and size of machined tabs to be fabricated for each porosity. It is understood that the final porosity of each large quantity sample was not dependent on the amount of material removed from the bulk suspension. The −80° C. sample was placed in a lyophilizing jar and lyophilized for 72 h to remove substantially all remaining water content. The resulting CNF solid was removed from the lyophilizer and machined into uniform tabs. Samples were created in accordance with this method with 90%-5% porosity (i.e., 10%-95% nanocellulose by volume).

The CNF solids were used to create standardized sample tabs for use in further characterization (e.g., of mechanical properties). Each resulting CNF solid was cut into a plurality of uniform tabs. Each tab was cut to be 110 mm in length, 20 mm in width, and 5 mm in thickness.

A measurement was performed to quantify density of each tab as well as to verify the porosity of each tab. A digital caliper was used to measure the width, length, and thickness of each tab. These measurements was used to calculate a volume for every tab. Each tab was weighed on a balance to find the mass. Using the mass and volume, the density of each tab was calculated. Furthermore, by taking the density of non-porous cellulose to be 1.5 g/cm$^3$ the porosity of each tab was individually calculated as:

$$1 - \left(\frac{\text{Measured density of tab}}{\text{Density of non-porous cellulose}}\right) * 100 = \text{Tab porosity}.$$

The Young's modulus of each tab was calculated using a standard 3-point bend test. The standardized sample tabs were loaded onto an 80 mm support span of an INSTRON 5500R with an INSTRON 4202 base. Data was collected on a connected computer using INSTON's Blue Hill® software.

Figure 9:
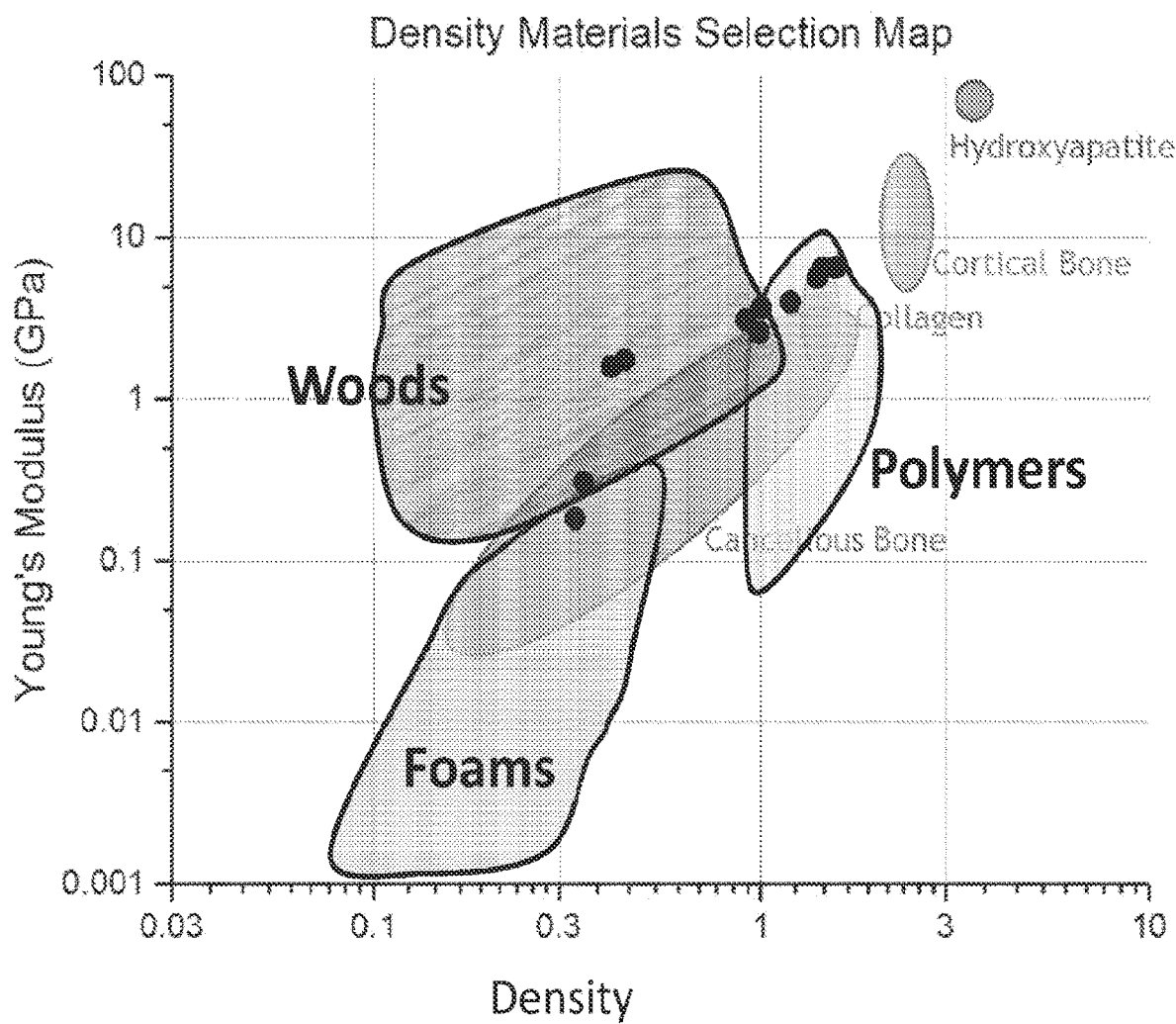
FIG. 9 shows a density graph comparing the density of various exemplary embodiments of provided compositions with that of other materials.

The properties of the characterized sample tabs were plotted on the scatter plot shown in FIG. 9. For comparative reference, value ranges for relevant classes of materials were additionally plotted on the figure. The data is plotted in a log-log representation. The black data points, represent characterized tabs fabricated from different large quantity samples (i.e., having different porosities).

As can be seen from FIG. 9, in this example, porous nanocellulose materials have been fabricated having Young's modulus from ~0.15~5 GPa and densities from ~0.4-2.5 g/m$^3$ These properties span those of a range of materials classes including polymers, woods, cancellous bone, and collagen. Thus, in certain embodiments, porous nanocellulose materials are used as bone replacements. In certain embodiments, further variation of properties is accomplished by inclusion of additives during fabrication. In certain embodiments, by altering processing conditions, porous nanocellulose materials having any properties between the ranges spanned in FIG. 9 are fabricated.

The foregoing description of the various aspects and embodiments of the present invention has been presented for purposes of illustration and description. It is not intended to be exhaustive of all embodiments or to limit the invention to the specific aspects disclosed. Obvious modifications or variations are possible in light of the above teachings and such modifications and variations may well fall within the scope of the invention as determined by the appended claims when interpreted in accordance with the breadth to which they are fairly, legally and equitably entitled.

EQUIVALENTS AND SCOPE

Those skilled in the art will recognize, or be able to ascertain using no more than routine experimentation, many equivalents to the specific embodiments of the invention described herein. The scope of the present invention is not intended to be limited to the above Description, but rather is as set forth in the following claims:

We claim:

1. A composition comprising:
   a plurality of nanocellulose fibrils, wherein the number of intermolecular hydrogen bonds in the composition that are nanocellulose fibril to nanocellulose fibril hydrogen bonds, is, per kilogram of material, between 2 and 10,000 times greater than the number of intermolecular hydrogen bonds of Kraft pulp that are nanocellulose fibril to nanocellulose fibril hydrogen bonds,
   wherein the composition is porous, and
   wherein the composition has a flexural modulus of from 1,000 MPa to 90,000 MPa.

2. The composition of claim 1, wherein the number of intermolecular hydrogen bonds in the composition that are nanocellulose fibril to nanocellulose fibril hydrogen bonds, is, per kilogram of material, between 10 and 1,000 times greater than that of Kraft pulp.

3. The composition of claim 1, wherein the composition comprises about 5 wt % to about 95 wt % nanocellulose fibrils.

4. The composition of claim 1, wherein the composition has a porosity of about 5 vol % to about 95 vol %.

5. The composition of claim 1, wherein the composition comprises an interior volume and an exterior volume, wherein the exterior volume at least partially surrounds the interior volume and a porosity of the interior volume and a porosity of the exterior volume are different.

6. The composition of claim 5, wherein the exterior volume completely envelops the interior volume.

7. The composition of claim 5, wherein the porosity of the interior volume is higher than the porosity of the exterior volume.

8. The composition of claim 5, wherein the porosity of the interior volume is lower than the porosity of the exterior volume.

9. The composition of claim 1, wherein the composition further comprises at least one additive.

10. The composition of claim 9, wherein the at least one additive is or comprises a nanomaterial or polymer.

11. The composition of claim 10, wherein the at least one additive is or comprises the nanomaterial and the nanomaterial is or comprises at least one of a nanoparticle, a nanosphere, a nanostar, nanowire, and a nanorod.

12. The composition of claim 11, wherein the nanomaterial is or comprises the nanoparticle and the nanoparticle comprises at least one metal or polymer.

13. The composition of claim 12, wherein the nanoparticle comprises a metal selected from the group consisting of gold, silver, platinum, any ferromagnetic metal, titania, copper, and combinations thereof.

14. The composition of claim 9, wherein the at least one additive is or comprises a mineral.

15. The composition of claim 14, wherein the mineral is selected from hydroxyapatite, calcium phosphate, and combinations thereof.

16. The composition of claim 1, wherein the flexural modulus is from 2,000 MPa to 10,000 MPa.

17. A composition comprising:
a plurality of nanocellulose fibrils, wherein the number of intermolecular hydrogen bonds in the composition that are nanocellulose fibril to nanocellulose fibril hydrogen bonds, is, per kilogram of material, between 2 and 10,000 times greater than the number of intermolecular hydrogen bonds of Kraft pulp that are nanocellulose fibril to nanocellulose fibril hydrogen bonds,
wherein the composition is porous, and
wherein porosity of the composition is homogeneous.

18. A composition comprising:
a plurality of nanocellulose fibrils, wherein the number of intermolecular hydrogen bonds in the composition that are nanocellulose fibril to nanocellulose fibril hydrogen bonds, is, per kilogram of material, between 2 and 10,000 times greater than the number of intermolecular hydrogen bonds of Kraft pulp that are nanocellulose fibril to nanocellulose fibril hydrogen bonds,
wherein the composition is porous, and
wherein porosity of the composition is heterogeneous.

19. The composition of claim 18, wherein the porosity has a gradual or stepwise variation.

* * * * *